United States Patent [19]
Li et al.

[11] Patent Number: 5,858,291
[45] Date of Patent: Jan. 12, 1999

[54] METHOD OF MAKING AN ELECTRICALLY CONDUCTIVE STRAIN GAUGE MATERIAL

[75] Inventors: Larry C.H. Li, Carrollton; Frederic S. Dawn, Houston, both of Tex.; Todd A. Pesek, Cottage Grove, Minn.

[73] Assignee: The United States of America as represented by the Administrator of the National Aeronautics and Space Administration, Washington, D.C.

[21] Appl. No.: 810,582

[22] Filed: Mar. 4, 1997

[51] Int. Cl.$^6$ ............................. B29C 43/02; B29C 43/40
[52] U.S. Cl. ....................... 264/105; 264/148; 264/160; 264/125
[58] Field of Search ..................... 264/104, 105, 264/125, 145, 146, 148, 151, 160, 163; 252/500, 511

[56] References Cited

U.S. PATENT DOCUMENTS

| | | | |
|---|---|---|---|
| 4,124,747 | 11/1978 | Murer et al. | 429/210 |
| 4,444,205 | 4/1984 | Jackson | 128/782 |
| 4,615,853 | 10/1986 | Aoyama et al. | 264/105 |
| 4,748,433 | 5/1988 | Jackson et al. | 338/6 |
| 4,791,016 | 12/1988 | Schulte et al. | 264/105 |
| 4,839,114 | 6/1989 | Delphin et al. | 264/105 |
| 5,086,785 | 2/1992 | Gentile et al. | 128/782 |
| 5,143,505 | 9/1992 | Burdea et al. | 414/5 |
| 5,184,319 | 2/1993 | Kramer | 364/806 |
| 5,213,736 | 5/1993 | Sumita et al. | 264/105 |
| 5,280,265 | 1/1994 | Kramer et al. | 338/210 |
| 5,611,964 | 3/1997 | Friend et al. | 264/105 |
| 5,738,816 | 4/1998 | Tidemann et al. | 264/151 |

*Primary Examiner*—Angela Ortiz
*Attorney, Agent, or Firm*—James M. Cate

[57] ABSTRACT

An improved elastomeric electrically conductive strain gauge for use in virtual reality systems is disclosed which involves the flash heating of a doped ethylene vinyl acetate elastomer.

13 Claims, 2 Drawing Sheets

METHOD OF MAKING AN ELECTRICALLY CONDUCTIVE STRAIN GAUGE MATERIAL

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

This invention relates to improvement in virtual reality equipment involving strain gauges and, more particularly, to a strain gauge incorporating an electrically conducting elastomeric element having a variable electrical resistance proportional to the amount of movement of digits to which the material is attached.

BACKGROUND OF THE INVENTION

It is progressively becoming more important and desirable to develop successful lower cost systems for achieving precise remote control of equipment which is required to perform, more or less, random exercises or functions. In developing such systems much attention has been directed toward imitating human movements with machines through the application of sensors which communicate to the remote apparatus movement of the controlling entity, usually a human being. Since the human hand is the most commonly used appendage for the performance of critical tasks, the hand has received the most attention realizing, however, that the technology which applies to the hand could apply to most other work performing parts.

Several systems are known which employ strain-sensing variable-resistance elastomeric strain sensors associated with gloves or the like for sensing bending of a wearer's fingers and producing output signals proportional to the degree of finger movement. A number of these systems employ flexible conductive materials which stretch to provide varying signals. For example, U.S. Pat. No. 5,280,265 discloses strain-sensing goniometer systems having sensing elements whose resistance varies with strain, such as an elastomeric strip impregnated with electrically conductive particles. The elastomeric, semi-conductive strip will usually be electrically integrated in a Wheatstone bridge section as described in such patent. Further, the output voltage from a joint bend sensor may be amplified and filtered and used to control the velocity and/or position of a joint servo motor controlling a slave device to perform a number of interesting acts. Usually, the strain gauges are mounted on a bulky glove. Electrically conductive materials are generally described in this same patent. U.S. Pat. No. 4,444,205 to Jackson also teaches the use of variable resistance elastomeric sensor elements associated with a finger or other member for detecting movement thereof. One or more strips of elastomeric material may be utilized, and the elastomer is composed of a non-conductive silicone-based rubber having carbon particles disbursed therein to provide electrical conductivity. Output signals may be processed and amplified for transmission to remote systems. U.S. Pat. No. 4,748,433 is for a sensor device in which an elastomeric, electroconductive member is used as a part of a sensor for measuring movement of a wearer's joint, and in which the variable-resistance sensors are formed of a silicone polymer gum containing carbon black particles, and in which the polymer is vulcanized by being subjected to an elected elevated temperature for several minutes, sometimes even hours. U.S. Pat. No. 5,086,785 also discloses carbon impregnated elastomeric rubber, silicone, plastic, etc. sensor means utilized with a glove to detect movement of a wearer's finger or the like and producing an output signal which may be processed and used for controlling a robot, or other remote system. This patent further lists many patents related to this technology.

While many advances have been made, the fact remains that there are still many drawbacks to successful, low cost and convenient virtual reality applications. The foregoing prior art also refers to and describes many other attempts at solving these problems. The discovery which is described below involves a new simply processed electroconductive elastomeric strain-gauge material which offers many advantages as will be more apparent from the following description. The discovery also includes a system which lends itself to greater applicability at substantially reduced cost.

SUMMARY OF THE INVENTION

This invention involves a new electrically conductive strain-gauge material in the form of an elastomeric polymer, specifically an olefin copolymer of ethylene and vinyl acetate (EVA). Such EVA copolymers are extremely popular and encompass a wide range of materials and properties. They are readily available in solid pellets or powders in forms which may be easily blended with other solid materials. In the practice of this invention a solid particulate EVA copolymer is doped with a conductive material, usually carbon black, by dry mixing in Brabender mixer, or equivalent, until a uniform conductive elastomeric material is created. This material is pressed into a sheet and formed into thin strips of uniform dimensions. These strips are usually from about 0.79 mm to about 3.18 mm thick. They are flash heated using known procedures and equipment for a period of at least about 3 seconds, preferably from 3 to 20 seconds, up to a temperature of from about 600° F. to about 700° F.

The thus formed electrically conducting elastomeric material is then positioned as a strain gauge, connected to separated connections in electrical communication with a means for sensing changes in resistance in the elastomeric conductor (or voltage between the ends) and translating such changes, usually through a computer, into signals to operate a slave device to perform desired operations. A most preferred article for achieving such virtual reality response would be something no more complicated than a glove having separated connections in electrical contact with a sensing means such as a resistance bridge and conversion means such as a computer. These separated connections would preferably be on the fingers of the glove with the knuckle of finger falling intermediate the separated connections such that the movement of the finger causes the electrical elastomeric conductor of this invention to elongate, changing its resistance and thus creating a signal for conversion into an operating signal for a slave device either across the room or around the world through modern communication means.

After conditioning cycles, the electrical elastomeric conductor of this invention has been found to give repeatable results without creating a hysteresis effect after repeated lengthening and contraction. It also provides the advantage of performing well when mounted on light, supple substrate such as a golf glove or a baseball batting glove which is easy to pull on and take off to clean.

DETAILED DESCRIPTION OF INVENTION

Figure 1:
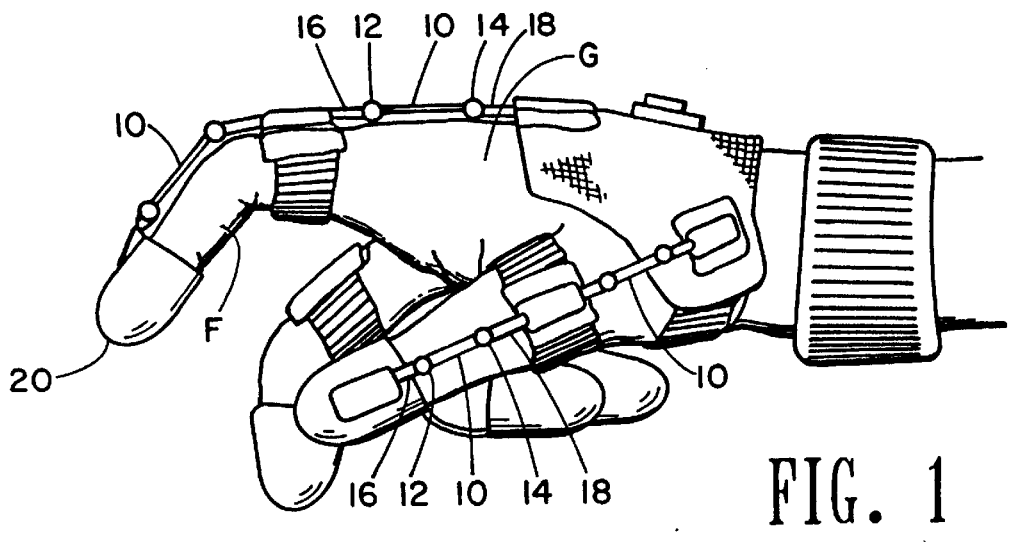
FIG. 1 is a finger shown schematically with the elastomeric strain gauge material mounted on it.

This invention relates to a motion sensing article such as a glove, for example, utilizing a plurality of elastic sensor elements each having electrical resistance which varies proportionally to the degree of longitudinal strain imparted thereto by movement of a wearer's fingers. Each sensor element is formed as a strip of elastomeric material, such as an ethylene vinyl acetate copolymer (EVA), doped with conductive metal or carbon black particles and then treated, by a brief, "flash", heat treatment raising the temperature of the strip to at least about 600° F. for about three to five seconds, to which, surprisingly, stabilizes the variance of resistance. Electric circuitry, which may include a well known resistance bridge section incorporating the sensor as one leg of the bridge, is employed for producing a signal proportional to a change in resistance along the sensor, wherein elongation of the sensor strip results in a proportional drop in voltage. The sensor is advantageously utilized in robotic and virtual reality applications wherein signals proportional to the movement of the wearer's finger, or other member, are processed, just as in the prior art, to provide command signals to a control system for controlling a robot arm, or hand, or the like. In the embodiment illustrated in FIG. 2 a plurality of the sensor elements are incorporated along the finger joints of a glove which is to be worn by the operator of a robot control system, whereby movement of the fingers causes signal variations which are processed and translated into "command" signals transmitted to servo-control motors or the like for driving one or more elements in the remote, slave system.

The strain gauge material of this invention is advantageously used as motion sensor material in environments such as robotics and virtual reality applications for providing signals proportional to the movement of one or more elements of a master or control system utilized in connection with the operation of a slave system, whether connected through hard wiring or located at great distances and controlled through the use of radio, laser, IR or wave signals. As a specific embodiment of the advantages of this invention, a plurality of the electrically conducting elastomeric polymer strips of this invention may be incorporated as a part of a flexible glove such as a golf glove or ordinary baseball batting glove worn by the operator of the master/slave control system wherein movement of the fingers causes elongation of the elastomeric electrically conductive material causing a decrease in voltage measured by a sensing circuit with leads attached to ends of the conductive elastomer. This decrease is converted, usually through a computer, to effect a proportional command signal on the slave which effects a corresponding movement of the slave element. The electrically conductive elastomeric strips extend along the finger portions of the glove and are attached to connectors in electrical communication with sensors positioned so that the bending of a knuckle, intermediate the connectors, will cause the strip to elongate. This elongation is sensed as a decrease in voltage between the connectors holding the ends of the electrically conducting elastomer. This voltage charge would be processed by a computer attached to the sensors using well known mathematical relationships between voltage and the stress placed on the elastomeric conductor and used to effect a proportional command signal which is transmitted to a slave operator or a remotely located robot for effecting a corresponding, or equivalent, movement of this slave element. Such applications and relationships are described in U.S. Pat. Nos. 4,444,205; 4,748,433 and 5,280,265 all of which are incorporated herein by reference for all purposes just as if reproduced in total herein.

In the preferred embodiment, the electrically conductive elastomer elements attached to a glove extend over and parallel to the fingers of the wearer such that the grasping of an object by the wearer causes an extension of the elastomeric materials to be elongated. The drop in potential along these elastomeric conductors is proportional to the movement of the fingers in the glove and, thus, will cause the movement of the "fingers" of the operator/slave hand. Of course, the foregoing discussion is applicable to other human joints for which there is a desire to measure or simulate movement. The substrate for the electrically conducted strain gauge material could thus be any article of clothing to which it could be attached. Preferably, the electrically conductive material would be attached to the separated connection in a manner that would place the material under some initial tension such that even the smallest movement causes an elongation of the conductor with a consequent change in voltage between connectors or resistance through the strain gauge.

Figure 2:
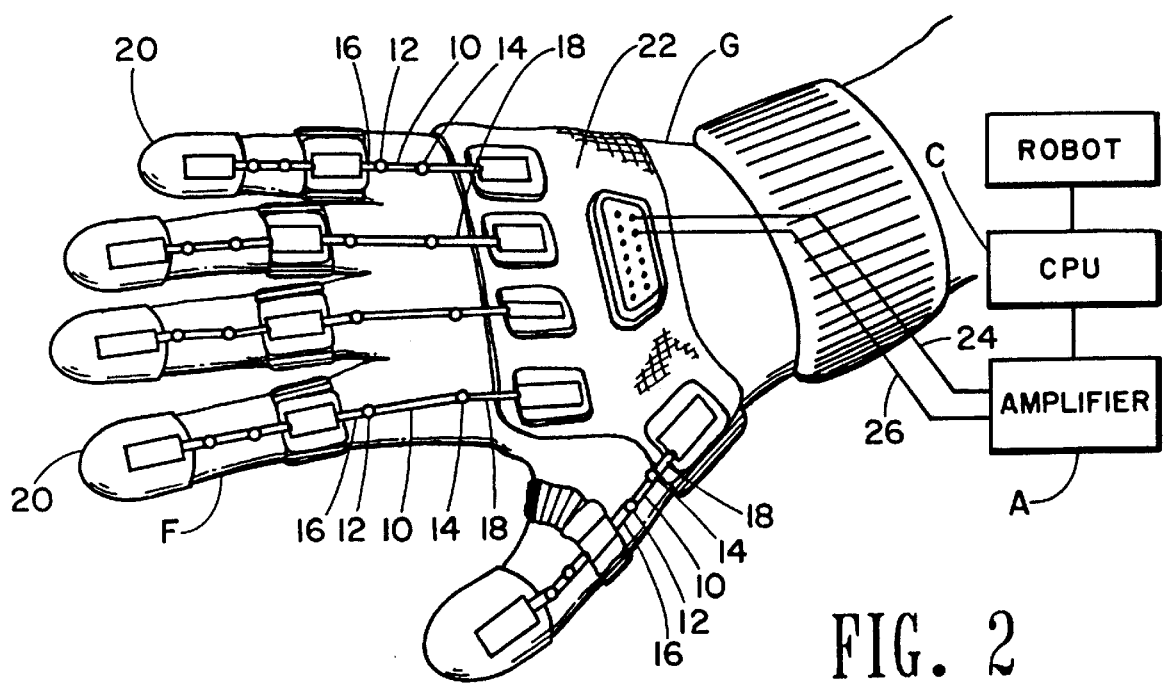
FIG. 2 is a schematic operating hand for achieving virtual reality incorporating the strain gauge of this invention.

The foregoing discussion is more specifically demonstrated by FIG. 1 showing finger F with the substrate glove G supporting the conductive elastomeric EVA polymer of this invention 10 anchored at either end by connectors 12, 14 which in FIG. 1 are shown connected to an elastomeric bands 16 and 18 anchored on the tip of the finger F by a cap 20. Of course, any sort of anchor on the tip is satisfactory as long as the inductive elastomer 10 is not relaxed or unduly tensioned by the choice. On the end of the conductive elastomer 10 proximate the hand is an anchor backing 22 made of any appropriate material such as, for example, a heavier leather or plastic. The elastic tensioning bands 16 and 18 are optional attachments useful to maintain a minimum amount of tension on the conductive elastomer 10 of this invention in order that the conductive elastomer 10 always be in slight tension. Thus, even the slightest movement is communicated to the slave operating equipment through appropriate processing equipment and servo mechanisms which cause movement to mimic the movement. To the connectors 12 and 14 are attached wires 24 and 26 which are connected generally to an amplifier circuit, a MC3303 operational amplifier (supplied by Motorola Semiconductor) is preferred, and fed as the raw input to the CPU of a computer for processing and translation into operating signals for the slave. Each finger on the master control hand would be similarly equipped as shown, for example, in FIG. 2. FIG. 2 also shows the elastomer oriented to the tensioner by movement of more than one knuckle on a finger.

The glove G shown in FIG. 2 is preferably a golf glove or a baseball batting glove which are easy to don and remove and relatively inexpensive when compared with the currently available products. For simplicity sake, only the operative elements are numbered on one of the fingers to show their actuation by more than one knuckle of the hand within the glove. Also, for simplicity sake, only the attached wire leads 24 and 26 are shown connected to the glove, it being understood that a pair of such wires would be used for each mounted conductive elastomeric conductor on the gloved hand that are involved in the virtual control of an operational slave unit. These signals carried through wires 24 and 26 are run through amplifier A, shown schematically, which may be of any of the known apparatus used for amplifying such signals as described in any of the prior art patents mentioned above. The amplified signal is then transmitted to a central processing unit C of a computer where the motion is processed and translated according to well known computer programs to convert the movement of the strain gauges into a corresponding signal to control the elements of a robotic operation. It is understood that it is not necessary for the entire system to be wired together and that communication between the hand housing the sensor and the operational slave robot responding to the signals from the conductive elastomeric sensor may be separated by great distance and transmitted by any means of telemetric communication. The signals to control the operational robot responding operate various mechanisms to cause the desired response to occur. These systems are well known to those skilled in the art and the improvement in such systems of this invention occur through the employment of the elastomeric, polymeric strain gauge of this invention.

The electrically conductive elastomeric conductor of this invention is prepared from a polyolefin copolymer, particularly ethylene vinyl acetate (EVA) copolymers which are tough and have the capability of being stretched and recovering their original shape when relaxed. Such EVA elastomers having an elongation yield point of from about 2% to about 8% are suitable for the practice of this invention. The electrical conductivity is imparted to the EVA copolymer by mixing an effective amount of a conductive material such as, for example, powdered aluminum, copper, iron, or carbon black, with carbon black being preferred into the EVA copolymer. The especially preferred carbon black is the C-100 provided by Chevron Chemical. Alternatively, copolymers such as ethylene propylene rubber, chloroprene, or urethane may be used.

Figure 3:
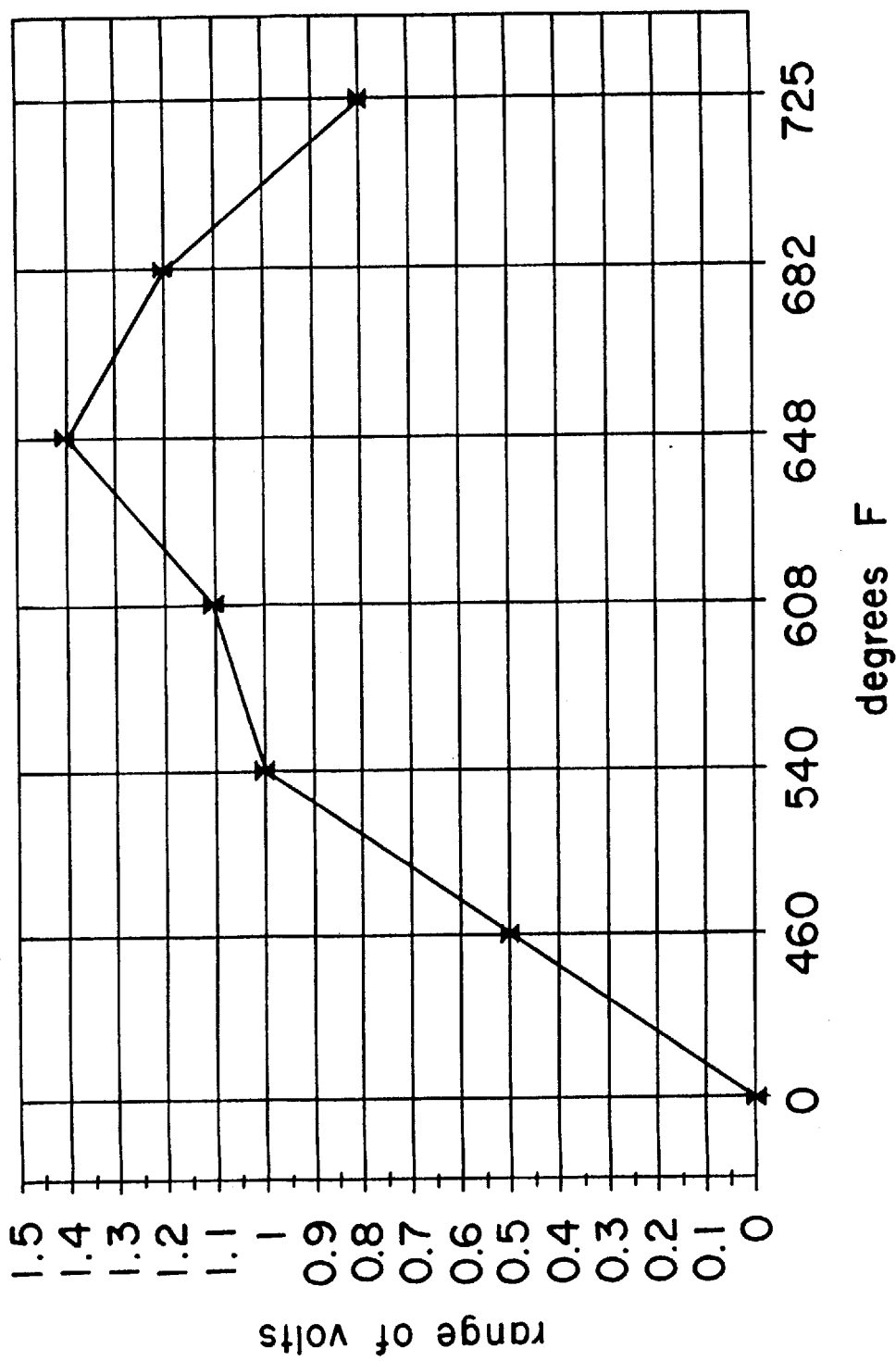
FIG. 3 shows the results of the final temperature obtained in the flush heat treatment of the conductive elastomer strain gauge material of the invention.

The carbon black is blended with a firmly divided dry EVA copolymer material either in powder or pellet form, in a readily available blender or mill designed for such activity in amounts of from about 20% to about 50% by weight based upon the polyolefin present in the mixture, with from about 30% to about 45% being preferred. After the blending has occurred for a sufficient period of time to obtain a substantially uniform distribution, the material is then pressed or rolled into a sheet, usually having a thickness from about 0.79 mm to about 3.18 mm. The thickness of the sheet, of course, should be uniform in order for successful application. Strips are cut from the sheet in dimensions desired for use as the strain gauge material. These dimensions usually would be from about ⅛ to about ⅜ inch wide and from ⅞ inch up to about 5 inches long, depending upon the use to which it is put or the joint which will cause the elongation. At this point while the elastomer is electrically conductive, but the voltage changes as it is expanded and contracted are erratic and it is, therefore, useless in this condition for the intended purpose. In order to impart repeatability and thus make it useful in the practice of this invention, or useful as a strain gauge in any respect, it has been discovered necessary to flash heat the strips, using commonly available heaters designed for quick heating (the preferred heater being an Unger Model #69650C) to heat the material for a period of at least 3 seconds, preferably from about 3 to about 20 seconds, to a temperature of greater than about 600° F. and, typically, between 600° F. and about 750° F. The effect of the heating is shown in FIG. 3. We have discovered that such a flash heating step causes the electrical characteristics to vary in a repeatable, predictable fashion, after a sufficient number of stretches and contractions to condition the conductivity of the elastomer such that the formulas for converting the changes in voltage into an angle of movement is repeatable, predictable and without hysteresis effect from repeated stressing and relaxation of the elastomeric conductor used as the strain gauge material. The conditioning is easily done by elongation and measurement of voltage access of the elastomeric material. Usually, less than about 20 conditioning cycles are sufficient.

The use of the strain gauge material of this invention will be better illustrated in connection with a specific embodiment.

EXAMPLE

A preferred strain gauge was prepared by dry blending 75 grams of a ethylene vinyl acetate copolymer (Ultrathene UE652000, Quantum Chemical Corporation) with 25 grams carbon black (C-100 from Chevron Chemical) in a Brabender mixer. The solid mixture was blended at 60 rpm and 180° C. for 5 minutes. The material, 100 grams of mixture, was removed from the blender and pressed into flat sheets of about ¹⁄₁₆ inch thick. Strips 6 inches by 2 inches were cut from the press and then further pressed between mylar films to a substantially uniform thickness of 0.010 inches (10 mils) using brass shims on either side as mold stops. Initial electrical resistance was measured at 210 Ω along the long axis and 130 Ω along the transverse axis. The material prepared according to the foregoing was heat treated by flash heating it to various temperatures of from about 325° F. to 750° F. over certain periods of time and temperature as monitored by a thermocouple. Each strap was tested to observe whether the increase resistance decreased when the strap was elongated using a commonly available tensile testing machine (Instorni). Ten cycles of elongation and release were run on each of the straps that showed a decrease in resistance when the strap was elongated. Table I below represents the readings from the first cycle for each of the straps prepared to determine the point where there was a decrease in resistance upon elongation.

TABLE I

| STRAP # | HEAT TREATMENT | STARTING LENGTH in. | STARTING RESISTANCE KΩ | ELONGATION in. | STRETCHED RESISTANCE KΩ |
| --- | --- | --- | --- | --- | --- |
| 1 | 325° f. for 3 sec. | 2.5 | 26.700 | .042 | 27.510 |
| 2 | 325° F. for 3 sec. | 2.5 | 24.600 | .072 | 28250 |
| 3 | 325° F. for 3 sec. | 2.5 | 20.512 | .142 | 26.010 |
| 4 | None | 2.5 | 5.880 | .210 | 9.900 |
| 5 old | unknown ≈ lots | ≈1.125 | 7.2 Megaohm | .144 | 0.4 Megaohm |
| 6 | 450° F. for 3 sec. | 2.5 | 21.600 | .210 | 28.620 |
| 7 | 450° F. for 3 sec. | 2.5 | 18.000 | .220 | 31.200 |
| 8 | 525° F. for 3 sec. | 2.5 | 17.531 | .218 | 51.563 |
| 9 | 525° F. for 3 sec. | 2.5 | 42.200 | .25 | 18.000 |

TABLE I-continued

| STRAP # | HEAT TREATMENT | STARTING LENGTH in. | STARTING RESISTANCE KΩ | ELONGATION in. | STRETCHED RESISTANCE KΩ |
|---|---|---|---|---|---|
| 10 | 650° F. for 3 sec. | 2.5 | 37.000 | .25 | 24.600 |
| 11 | 650° F. for 3 sec. | 2.5 | 54.000 | .25 | 28.000 |
| 12 | 750° F. for > 5 sec. | 2.5 | 23.000 | .25 | 16.000 |
| 13 | 750° F. for >5 sec. | 2.5 | 63.5 | .25 | 51.500 |

The resistance for each strap heated at <525° F. result in an increase in resistance (except for strap No. 9) which was heated at the same time strap No. 8 was heated suggesting that 525° F. is a transition point. However, at 650° F. the resistance decreased with elongation. These straps were recycled for 10 times with the initial pull of each strap being different from the subsequent pulls. This suggests that an orientation occurs with the initial tensioning cycles that allows the strap to work into its operating condition to give repeatable results. A linear range exists of from about 0.040 inches change in elongation that has greater than 10,000 Ω variance in resistance. This is the segment of the voltage change in which it is preferable for virtual reality apparatus, particularly a virtual reality glove, to operate in. The resistance range of the strap while being cycled decreases as the cycles increase, causing it to be necessary to build in some adjustment factor. A preconditioning treatment of about 20 cycles has been determined to cause a conveyance to a fixed profile which obviates the necessity of an additional adjustment factor. The conveyance of result to a consistent value can be accomplished by attaching the sensor to the Instorm tensile tester and take readings during each cycle until a consistent value is reached. Greater or fewer conditioning cycles can easily b determined by those skilled in the art.

From the above discussion of this invention those skilled in the art will be able to make many variations, modifications and applications of the strain gauge of the invention without departing from the claims of the invention.

What is claimed is:

1. A method for the preparation of an electrically conductive strain gauge material having an electrical resistance which varies with elastic extension and contraction comprising the steps of:

blending an effective amount of conductive particles with a finely divided ethylene vinyl acetate copolymer for a sufficient time to produce uniform mixture of the conductive particles throughout the polymer;

pressing the mixture into a sheet having a thickness of from about 1/32" to about 1/8";

cutting strips of the film and pressing the sheet to a substantially uniform thickness of about 10 mils;

dimensioning the strips for use as strain gauge material; and flash-heating the strips to a temperature of at least about 600° F. for a period of at least about three seconds.

2. The method of claim 1 wherein the conductive material is a carbon black.

3. The method of claim 2 wherein the carbon black is present in an amount of from about 20% to about 50% by weight.

4. The method of claim 1 wherein the dimensions of the strips are from about 1/8 to 3/8 inches to about 7/8 to 5 inches long.

5. The method of claim 1 wherein the flash heat was applied for a time of from about 3 to about 20 seconds.

6. The method of claim 5 wherein the temperature of the flush treated material was from about 600° to about 750° F.

7. The method of claim 1 which includes the additional step of conditioning the strain gauge material with a sufficient number of stretch cycles to achieve consistency of result.

8. A method for the preparation of an electrically conductive strain gauge material having an electrical resistance which varies with elastic extension and contraction comprising the steps of:

blending an effective amount of conductive particles with a finely divided copolymer for a sufficient time to produce uniform mixture of the conductive particles throughout the polymer;

pressing the mixture into a flexible sheet having a predetermined thickness;

cutting strips of the film and pressing the sheet to a substantially uniform thickness less than the predetermined thickness;

dimensioning the strips for use as strain gauge material; and flash-heating the strips to a temperature of at least about 600° F. for a period of at least about three seconds.

9. The method of claim 8 wherein the conductive material is a carbon black.

10. The method of claim 9 wherein the carbon black is present in an amount of from about 20% to about 50% by weight.

11. The method of claim 8 wherein the flash heat is applied for a time of from about 3 to about 20 seconds.

12. The method of claim 10 wherein the temperature of the flush treated material is from about 600° to about 750° F.

13. The method of claim 8 which includes the additional step of conditioning the strain gauge material with a sufficient number of stretch cycles to achieve consistency of result.

* * * * *